I. M. MILBANK

Cartridge.

No. 2,716.

Reissued Aug. 6, 1867.

Witnesses.

Geo. S. Walker

Chas. H. Smith

I. M. Milbank
per L. N. Sewell
Atty

UNITED STATES PATENT OFFICE.

ISAAC M. MILBANK, OF GREENFIELD HILL, CONNECTICUT.

IMPROVEMENT IN METALLIC CARTRIDGES.

Specification forming part of Letters Patent No. 62,283, dated February 19, 1867; Reissue No. 2,716, dated August 6, 1867.

*To all whom it may concern:*

Be it known that I, ISAAC M. MILBANK, of Greenfield Hill, in the county of Fairfield and State of Connecticut, have invented and made a certain new and useful Improvement in Cartridges; and I do hereby declare the following to be a full, clear, and exact description of the said invention, reference being had to the annexed drawing, making part of this specification, wherein—

Figure 2:
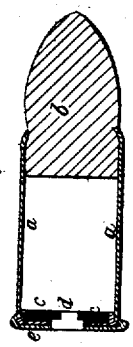
Figure 3:
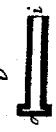
Figure 1:
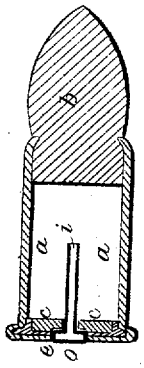

Figure 1 is a longitudinal section of a cartridge fitted with my improvement. Fig. 2 is a section of the case and its metallic base, and Fig. 3 is a section of my fulminate-tube.

Similar marks of reference denote the same parts.

Cartridges have heretofore been made with a base introduced within the sheet-metal case, and held in place by crimping or pressing the sheet metal into cavities in the edges of the disk; but, practically, this device is found unreliable, because the disk is liable to yield by the blow of the hammer, and there is no support furnished to the sheet metal of the case at the base, because the gases pass in between such base and the sheet metal, and hence the case is almost as much liable to burst at the rear with such bases as without them.

The object of my invention is to provide a metallic cartridge-case that can be loaded and used as fixed ammunition, or may be loaded several times with powder and ball, so as to avoid carrying so much weight of cartridge-cases and save their cost.

The nature of my said invention consists in a metallic base introduced within the sheet-metal case, and soldered permanently in place, so as to afford the necessary strength to resist the blow of the hammer upon the fulminating material, which fulminate I introduce in a hollow cap having a tube projecting into the powder of the cartridge.

These tubes and caps are changeable, so that when one has been fired it can be withdrawn from the case and another introduced and the case reloaded.

By using these tubular caps the fire from the fulminate communicates with the gunpowder near the center of the charge, rendering the same much more effective than when the fire is only at the rear end.

In the drawing, *a* is the sheet-metal cartridge case or shell, of any usual size or shape; *b*, the ball. *c* is a metallic base sufficiently strong to resist the force of the hammer striking against the rear of the cartridge.

The base *c* is permanently attached within the case *a* by soldering the same into its place, and the base *e* of the case *a* covers up the base *c*, so that said base *c* may be made of iron or other cheap metal.

Through the center of the base *c* is an opening with a countersink at the rear portion, and into this I introduce the tubular fulminate-cap, formed with a hollow head, *o*, and a tube, *i*, extending any required distance into the powder-space of the cartridge.

The hammer of the fire-arm is to strike the cap *o* in the rear, to explode the fulminate contained therein.

My cartridge is much stronger at the base than those heretofore made, because the thin sheet metal cannot be injured by the force of the explosion, in consequence of the base *c* firmly supporting the same by being brazed or soldered thereto, thus counteracting any defect or weakness of the sheet-metal case at the base.

What I claim, and desire to secure by Letters Patent, is—

1. A metallic base, *c*, of sufficient strength to resist the force of the hammer in exploding the fulminate, in combination with a sheet-metal cartridge-case, when the said base is introduced within the cartridge-case, and secured thereto by soldering or brazing, as and for the purposes set forth.

2. The base *c*, soldered or brazed inside the sheet-metal cartridge-case *a*, in combination with the fulminate-tube *i*, sitting within an opening in the base *c*, as and for the purposes set forth.

3. Strengthening the base of an ordinary sheet-metal cartridge-case by a disk or base soldered or brazed within said case, substantially as set forth.

In witness whereof I have hereunto set my signature this 9th day of July, A. D. 1867.

ISAAC M. MILBANK.

Witnesses:

GEO. T. PINCKNEY,

GEO. D. WALKER.